(No Model.) 2 Sheets—Sheet 1.
G. H. PRESTON.
SEEDING MACHINE.
No. 339,578. Patented Apr. 6, 1886.
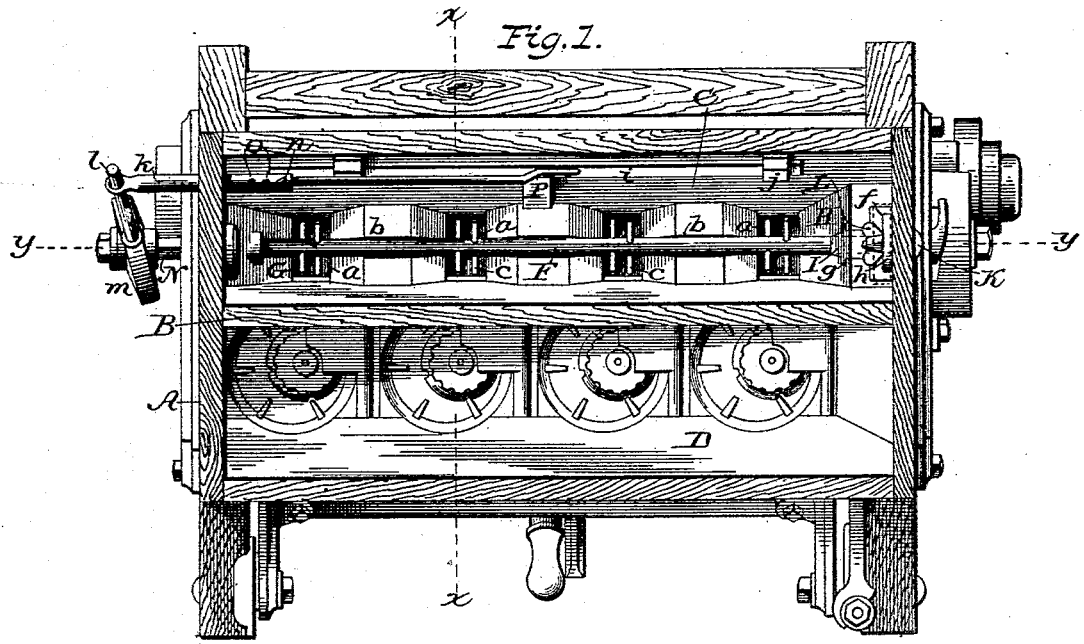
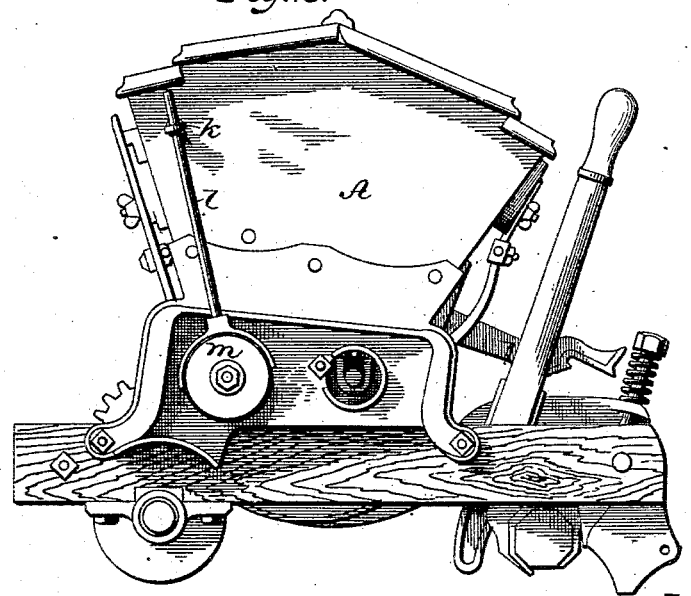
Witnesses: Inventor:

(No Model.) 2 Sheets—Sheet 2.

G. H. PRESTON.
SEEDING MACHINE.

No. 339,578. Patented Apr. 6, 1886.

Witnesses:
Jas. F. DeHamel
R. S. Ferguson

Inventor:
George H. Preston,
by Dodge & Son,
his Attys.

UNITED STATES PATENT OFFICE.

GEORGE H. PRESTON, OF SHORTSVILLE, NEW YORK.

SEEDING-MACHINE.

SPECIFICATION forming part of Letters Patent No. 339,578, dated April 6, 1886.

Application filed August 10, 1885. Serial No. 174,009. (No model.)

*To all whom it may concern:*

Be it known that I, GEORGE H. PRESTON, of Shortsville, in the county of Ontario and State of New York, have invented certain new and useful Improvements in Seeding-Machines, of which the following is a specification.

My invention relates to grain-drills; and it consists more particularly in an agitator (one or more) placed in the hopper, and so constructed and arranged as to preclude the bridging over of the grain above the seed-cups or distributers.

This invention is designed with reference more especially to what are commonly known as "rust-proof" or "Southern" oats, which are peculiarly difficult to plant or drill with existing machines. To obviate the difficulty mentioned, I employ within the hopper or seed-box a rotary agitator, which acts not only in the lower part of said hopper or box, but also in the mouths of the seed cups or distributers. I further employ in connection with said rotary agitator either a reciprocating or a second rotating agitator above the first. These devices, together with various details of construction connected therewith, constitute my invention.

Figure 4:
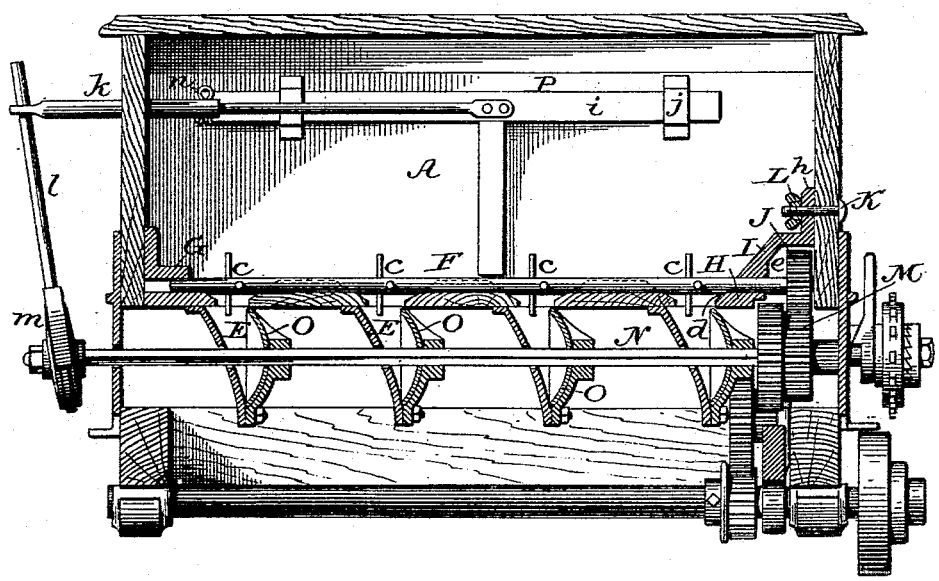
Figure 3:
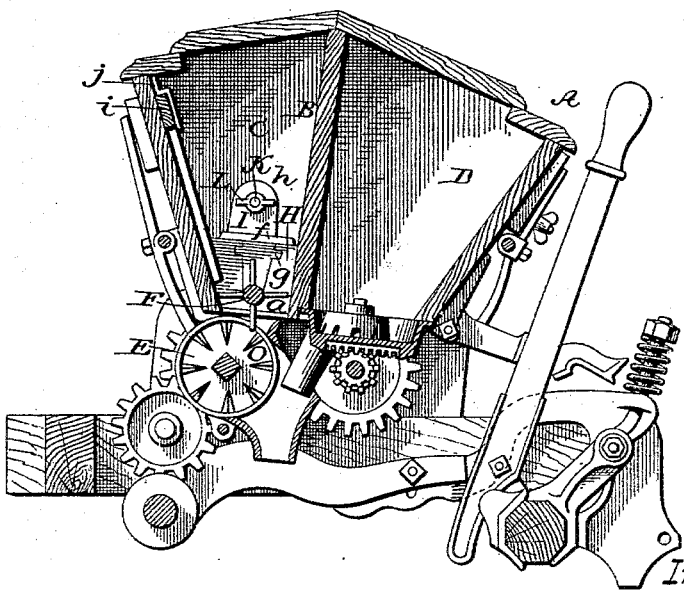

In the accompanying drawings, Figure 1 is a top plan view of the hopper and distributing mechanism of a combined seeder and fertilizer-distributer embodying my invention; Fig. 2, an outside end view of the same; Fig. 3, a vertical cross-section on the line $x\ x$ of Fig. 1; Fig. 4, a longitudinal section on the line $y\ y$ of Fig. 1.

A indicates a seed box or hopper, divided by an upright longitudinal partition, B, into compartments C and D, the former for seed and the latter for fertilizer.

The fertilizer-distributing devices constitute no part of the present invention, nor is the particular form or style of seed-distributer a matter of any importance. The hopper-compartment C is provided with a series of outlet-openings, $a$, through its bottom, the sides of which openings are inclined downward and inward to facilitate the outflow of grain to the seed-cup E, placed beneath said opening $a$. The hopper-bottom thus presents a series of raised surfaces and depressions containing outlet-openings, as plainly shown in Figs. 1 and 4. The depressions thus formed constitute hoppers for the seed-cups E, and it is in or over these secondary hoppers mainly that the grain bridges, and thus prevents the proper passage of grain into the seed-cups.

F indicates a shaft, preferably of cylindrical form, extending lengthwise of the compartment or hopper C, carried in suitable bearings at each end of said hopper and supported in a groove, $b$, formed in the upper face of the raised portions of the hopper-bottom, as shown in Figs. 1 and 4.

Directly over each outlet-opening $a$ the shaft F is furnished with radial arms or pins $c$, (one or more,) which, as the shaft rotates, travel through the grain and serve to loosen it up and destroy the bridge or arch of grain there forming. The location of the shaft F is such that the arms or pins $c$ not only act in the lower part of the hopper C, but also reach down into the mouths of the seed-cups E, and effectually prevent the lodging or clogging of grain therein. By saying that the arms or pins reach down into the mouths of the seed-cups I mean not merely into the secondary hoppers formed by beveling the walls of the openings in the hopper-bottom, but I have reference to their working within the seed-cup itself below the hopper-bottom.

In practice I prefer to construct the agitator as illustrated in the drawings—that is to say, making it to consist of a cylindrical shaft or rod with two pins passed through it over each opening $a$ at right angles to each other, each pin projecting equally from opposite sides of the shaft, as best shown in Fig. 3. It is obvious, however, that instead of the pin $c$ a boss or hub with projecting studs or pins, or a disk with fluted faces, may be used, or that other modifications of this character may be made without departing from the spirit of my invention.

It is desirable to provide for the ready removal of the agitator from the hopper, and for this reason I mount the shaft F in the manner illustrated in Figs. 1, 3, and 4, in which G and H indicate metal supporting blocks or castings, and I a removable retaining-piece, to prevent the withdrawal of the shaft from its bearing in said blocks or castings. The casting G contains merely a circular or nearly circular hole or seat for one end of shaft F, large enough, however, to permit said end to be inserted or withdrawn while the opposite end is lifted up. The casting H is made with a semicircular seat, *d*, in which the shaft has a bearing at or near its end, and back of said seat or between it and the end of the hopper an opening, *e*, is formed in the casting, of such size and shape as to permit the shaft F and its driving-pinion J to be passed through in placing the shaft in or removing it from position. Block or retaining-piece I is of a size and form to fill and close the opening *e*, and is formed with ribs or flanges *f* and *g*, which pass, respectively, above and below the body of casting H, and thus retain the piece I at its proper elevation. Retaining-piece I is fashioned to fit closely down upon shaft F, and to complete the bearing for that end which carries the pinion J, and it is further provided with an upright lug, *h*, which is made fast to the end of the hopper C by means of a bolt, K, provided with a thumb-nut, L. The thumb-nut is provided merely for convenience in releasing the bolt preparatory to removal of the retaining-piece I, which, being released by the removal of said nut, can be horizontally withdrawn from casting H, leaving the shaft F and its pinion J free to be lifted up clear of casting H, after which a slight endwise movement of the shaft will withdraw its other end from its socket or bearing. After such removal, the retaining-piece I, being restored to its place, closes the opening *e*, and leaves only the small shaft-hole open. This being extended horizontally for quite a distance, and of small diameter, will permit very little if any grain to escape, but may be entirely closed by a small wooden plug, or in any equivalent manner.

In order to maintain relative uniformity in the rate of the feeding action and the action of the agitator, I drive the shaft F by means of a pinion, M, secured upon the shaft N, which carries the grain-wheels or distributers O, said pinion meshing directly with pinion J of shaft F. Thus when the grain-wheels increase or decrease their speed or rotation, the agitator correspondingly increases or decreases its speed and loosens up the grain as rapidly as needed. This mode of driving is not essential, however, but intermediate gearing may be employed, or a chain-belt or equivalent driving mechanism.

It is desirable ordinarily to provide a second agitator above the first to loosen up the mass or main body of grain in the hopper. For this purpose I may employ another agitator of like construction with the first; or, as is preferred, a reciprocating agitator may be employed. Such a reciprocating agitator is illustrated in Figs. 1, 3, and 4, in which P indicates the agitator as a whole, consisting of a bar, *i*, provided with fingers or projections and sliding in suitable guides, *j*, said bar being connected by a telescopic rod, *k*, with an upright arm, *l*, carried and actuated by a wabbling disk, *m*, keyed or otherwise made fast to the grain-wheel shaft N. This means of producing a reciprocating motion is not original with me. Nor is the broad idea of a reciprocating agitator; hence neither of said features is broadly claimed by me. It is, however, often desirable to disconnect the reciprocating agitator from its actuating mechanism, and for this reason the telescopic rod *k* is employed, its two sections being connected by a spring key or pin, *n*, passing through both, or by any equivalent device, withdrawal of which will permit the outer section of the rod to reciprocate independently of the inner section, and consequently without affecting the agitator P.

By providing several holes, *o*, for pin *n*, I am enabled to adjust the parts, so that the depending fingers *p* of the agitator P shall move a greater or less distance in one or the other direction.

The teloscopic rod *k* is conveniently made of a piece of round iron rod attached to the sliding bar *i*, and a piece of gas or water pipe having an eye at one end to receive the upright actuating rod or arm *l*.

It is obvious that the agitator-shaft F might extend outward through and beyond the end of the hopper, and there be driven by gear or otherwise; but the arrangement shown and described is preferred, because it permits the removal of the agitator, and because the gearing is covered and protected.

I am aware that a fertilizer-distributer has been patented, in which a combined stirrer and agitator is provided, and made removable through the end of the hopper, said device being at all times essential to the utility of the distributer. My agitator is made removable from within the hopper upward through the top, and is especially designed for use in connection with seed-cups and seed-distributing wheels beneath the hopper. It is important to make it thus removable, in order that it may be present when required for seed of certain character, and absent when sowing seed which does not require its use, but is liable to be injured thereby. While, therefore I do not broadly claim a removable agitator, I believe that my construction is new, and that a new and useful combination is made.

Having thus described my invention, what I claim is—

1. In combination with hopper C and seed-cups E, rotary shaft F, located in the lower part of the hopper and provided with projections extending upward into the hopper and downward into the mouths of the seed-cups beneath said hopper.

2. In combination with hopper C, end pieces or castings, G and H, provided, respectively, with a socket and with openings *e*, one to receive one end of the shaft and the other to permit the insertion and removal of the other end of said shaft with its driving-pinion, shaft F, provided with pinion J, and retaining-piece I, applied to casting H and serving to retain the shaft in place.

3. In a seeding-machine, the combination of a hopper, a series of seed-cups beneath said hopper, and a rotary agitator mounted in the lower part of the hopper projecting through the bottom thereof into the seed-cups and adapted to be removed at will, whereby the machine is adapted to distribute different kinds and qualities of seeds.

4. In combination with hopper C, provided with castings G H, seeding devices beneath said hopper, agitator-shaft F, provided with pinion J, retaining-piece I, applied above said shaft and serving as a cover for the pinion, and a fastening-bolt and nut for said piece I, all arranged substantially as shown and described.

5. In combination with hopper C, having groove, agitator-shaft F, supported at its ends in suitable bearings and resting in the bottom of the groove at intermediate points, substantially as set forth.

6. In combination with reciprocating agitator P and actuating mechanism therefor, telescopic connecting-rod $k$ and a fastening to unite the two sections of said rod, substantially as described and shown.

7. In combination with hopper C and agitator P, wabbling wheel or disk, upright rod, and telescopic rod $k$, connecting the rod and agitator-slide.

8. In a seeding-machine, the combination of a hopper, seed-cups beneath the hopper, a rotary agitator located in the lower part of the hopper and adapted to work therein and in the mouths of the seed-cups, and a secondary agitator located in the hopper above the first.

GEORGE H. PRESTON.

Witnesses:
N. K. COLE,
NORMAN WILLSON.